Nov. 3, 1931.      S. J. BENS      1,830,083
CHAIN LINK FOR EFFICIENT ENGAGEMENT WITH POWER PULLEYS
Original Filed Oct. 1, 1928
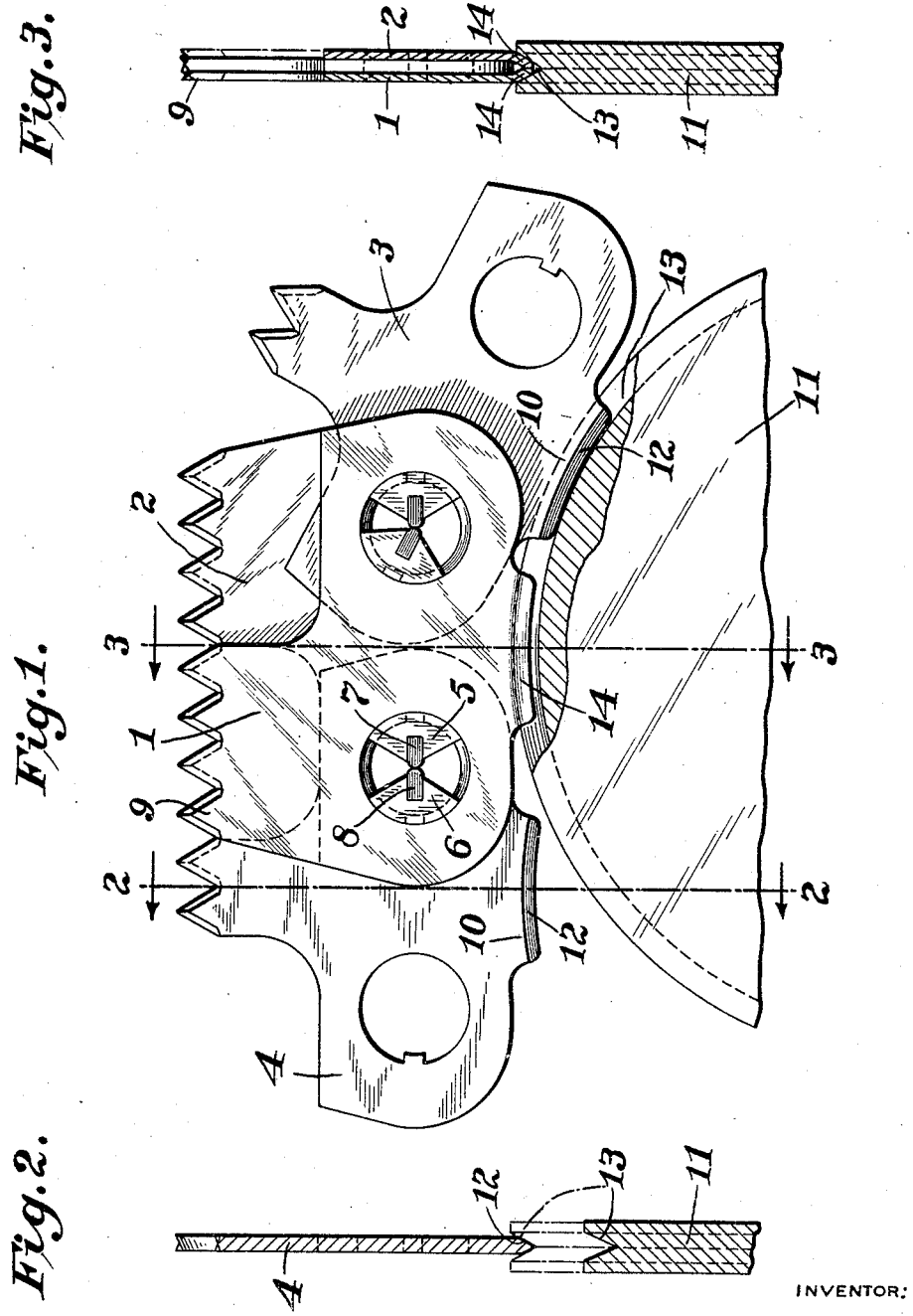
INVENTOR:
Samuel J. Bens,
BY
ATTORNEYS.

Patented Nov. 3, 1931

1,830,083

UNITED STATES PATENT OFFICE

SAMUEL J. BENS, OF NEW YORK, N. Y., ASSIGNOR TO CHAIN SAW CORPORATION, OF NEW YORK, N. Y., A CORPORATION OF NEW YORK

CHAIN LINK FOR EFFICIENT ENGAGEMENT WITH POWER PULLEYS

Application filed October 1, 1928, Serial No. 309,571. Renewed April 13, 1931.

This invention relates to a chain or belt of the link type adapted to pass over a drive and a driven pulley in an endless manner to perform any useful work.

While this type of chain or belt has particular adaptation in connection with a chain saw used for felling timber, yet obviously it is not limited to such use.

The principal object of the invention is to provide a chain of the above type which will encounter a minimum amount of friction when passing over the drive pulley and which will to a maximum extent provide an even pull to the cutting run, when used as a saw, to prevent undesirable intermittent pulsations.

To this end the invention contemplates the provision of a series of links arranged in units of three; that is, a double link comprising two spaced apart side plates which grasp between their ends single drag or connecting links in repeated series.

Any suitable means may be provided to pivot the three overlapped ends together so as to insure a minimum amount of friction and wear at this point.

Between the ends of each link a pulley engaging portion is provided which extends nearer to the center of the pulley in the case of the single links than in the case of the double links. In the case of the single links, this pulley engaging portion is so formed and arranged that it will actually wedge into the V-shaped groove of the pulley and take the major portion of the pull.

In the case of the double links, these projecting portions are deformed toward each other but are not sufficient in extent to become wedged in the V-groove of the power pulley, although they do snugly contact therewith.

The purpose of this construction is that as the single links pass over the crest of the power pulley and begin to pivot about its following double neighbors, the projecting portions of the double links will rest in the pulley groove only to the extent to bridge the gap between the pulsations on the cutting run between engagements of the single links with the power pulley.

As soon as the following or second single link comes into engagement with the pulley groove, it takes the major portion of the power pull, with the result that the intermediate double links are practically bridged between single links and contact with the side of the pulley groove only to an extent sufficient to steady the entire composite blade.

The invention further consists in the novel arrangement, combination and construction of parts more fully shown and described.

In the drawings:

Figure 1 is a plan view showing four links of a chain embodying my invention, passing around a drive shaft.

Fig. 2 is a sectional view along the line 2—2 of Fig. 1.

Fig. 3 is a sectional view along the line 3—3 of Fig. 1.

Referring now to the embodiment illustrated, I have shown a double link comprising a pair of side plates 1 and 2 enclosing between their ends links 3 and 4.

The overlapping ends of the three links are provided with any desired form of pivot means, such as that described in my co-pending application Ser. No. 297,185, filed August 3, 1928, or that described in my copending application 309,570, filed October 1, 1928.

In this case the pivot means comprises, for instance, a segment 5, the curved portion of which engages with the walls of the aperture in link plates 1, 2 and 4, and a similar segment 6 likewise located in these aligning apertures. Keys 7 and 8 located in segments 5 and 6 respectively engage each other on a line contact and not only serve the purpose of preventing accidental displacement of the segments, but when link 4 pivots with regard to double link plates 1 and 2, the keys 7 and 8 rock on each other and carry the entire frictional strain. Inasmuch as the segment 5 is fixed and moves with the link 4 and the segment 6 is fixed and moves with double link plates 1 and 2, the segments proper receive no particular wear and may be made of cheaper material, while it is only necessary to make the keys 7 and 8 of hardened steel, as they take the entire pull between links.

In the embodiment illustrated, I have shown each of the links as being provided with teeth 9 so that in a longitudinal contour these teeth form a continuous run. Of course, this adaptation is to be used in connection with a chain saw only, and where the invention is to be used in a link belt, these teeth may be dispensed with.

The links 3 and 4 are provided with projecting portions 10 extending toward the center of the drive pulley 11, these portions being beveled as at 12 at their extremities for engagement with the walls 13 of the V-groove in the periphery of the pulley 11.

The double links comprising plates 1 and 2 are provided with a similar portion 14 except that the sides are not beveled, but on the other hand, are deformed so as to contact with the wall 13 of the pulley 11 when in supporting engagement. As clearly shown in Fig. 1, the portion 12 of the single links enters the V-groove to a greater extent than the portion 14 of the double links.

In operation and with reference to Fig. 1, we will assume the links shown to be a portion of an endless belt or chain, the drive pulley 11 moving in a clockwise direction.

It will be apparent that in the position shown, the link 3 is bearing the entire pull of the pulley by reason of the wedge engagement between the walls 12 of the projection 10 and the walls 13 of the pulley 11. Were the projecting portions 14 of the double link comprising plates 1 and 2 not in contact with the walls of the V-groove in the pulley, it would be apparent that the double link plates 1 and 2 would occupy a much lower position than they do in Fig. 1, and as a result there would be no pulsation on the chain between engagements with the pulley of the link 3 and the link 4. As shown, however, double link plates 1 and 2 have already made contact with the wall of the pulley, as shown in Fig. 3, with the result that these two links are held in line, although they contribute a negligible amount to the pull of the chain, this being borne almost entirely by the link 3 in the position of Fig. 1.

Further rotation of the pulley 11 causes the link 4 to engage the groove in the pulley periphery in the same manner as described for link 3, with the result that it then assumes the load, and so on around the chain.

While the links as shown are passed around the pulley, it will be apparent that the double link comprising plates 1 and 2 is substantially bridged between links 3 and 4, and as only a superficial contact is made between the double link and the pulley, no appreciable wear occurs at this point, substantially the entire pull being borne by the series of single links all the way around the pulley.

What I claim is:

1. A link belt comprising alternating overlapped single and double links, the single links having their ends enclosed between the ends of the side plates of the double links, a projection on each of the single links for engagement with a drive pulley, and a lesser projection on each of the double links for superficial contact with the drive pulley.

2. A link belt comprising alternating overlapped single and double links, the single links having their ends enclosed between the ends of the side plates of the double links, a projection on each of the single links for engagement with a drive pulley, and a lesser projection on each of the double links for superficial contact with the drive pulley, the projections on the double links comprising extended, lower edges of the side plates bent inwardly and meeting.

In testimony whereof, I affix my signature.

SAMUEL J. BENS.